(12) United States Patent
Goyal et al.

(10) Patent No.: US 8,736,770 B2
(45) Date of Patent: *May 27, 2014

(54) METHOD AND SYSTEM FOR AN INTEGRATED VSB/QAM/NTSC/OOB PLUG-AND-PLAY DTV RECEIVER

(75) Inventors: Maneesh Goyal, Signal Hill, CA (US); Charles A. Brooks, Laguna Beach, CA (US); Randall B. Perlow, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 307 days.

This patent is subject to a terminal disclaimer.

(21) Appl. No.: 13/102,092

(22) Filed: May 6, 2011

(65) Prior Publication Data

US 2011/0255009 A1    Oct. 20, 2011

Related U.S. Application Data

(63) Continuation of application No. 11/764,515, filed on Jun. 18, 2007, now Pat. No. 7,940,337, which is a continuation of application No. 10/774,037, filed on Feb. 6, 2004, now Pat. No. 7,250,987.

(51) Int. Cl.
*H04N 5/44*    (2011.01)

(52) U.S. Cl.
USPC ............................. 348/725; 348/726; 348/555

(58) Field of Classification Search
USPC .......... 348/725, 726, 552–558; 725/110–151, 725/54
See application file for complete search history.

(56) References Cited

U.S. PATENT DOCUMENTS

| 5,715,315 | A | 2/1998 | Handelman |
| 5,850,218 | A | 12/1998 | La Joie et al. |
| 6,154,505 | A | 11/2000 | Konishi et al. |
| 6,307,598 | B1 | 10/2001 | Limberg |

(Continued)

FOREIGN PATENT DOCUMENTS

| WO | WO 0027066 | 5/2000 |
| WO | WO 0120899 | 3/2001 |
| WO | WO 02084996 | 10/2002 |

OTHER PUBLICATIONS

Gass, W., "Architecture Trends of MPEG Decoders for Set-Top Box," Proceedings of the SPOE, Bellingham, VA, USA, vol. 3021, pp. 162-169, Feb. 12, 1997, XP000648211, ISSN: 0277-786X.

(Continued)

*Primary Examiner* — Michael Lee
(74) *Attorney, Agent, or Firm* — Foley & Lardner LLP

(57) ABSTRACT

A method for processing signals in a communication system may include performing by one or more processors and/or circuits integrated within a single digital television (DTV) receiver chip, demodulating a wirelessly received digital inband signal and a wirelessly received digital out-of-band signal. The demodulating may include equalizing the received digital inband signal and the received digital out-of-band signal. The demodulated digital inband signal and the demodulated digital out-of-band signal may be error corrected. One or more TV channels may be generated based on one or both of the error corrected demodulated digital inband signals and/or the error corrected demodulated out-of-band signals. The wirelessly received digital inband signal may include a VSB signal, a NTSC signal and/or a QAM signal. The one or more processors and/or circuits may perform decoding the wirelessly received digital inband signal.

63 Claims, 10 Drawing Sheets

(56) References Cited

U.S. PATENT DOCUMENTS

| | | |
|---|---|---|
| 6,369,857 B1 | 4/2002 | Balaban et al. |
| 6,556,251 B1 | 4/2003 | Sorensen |
| 6,757,909 B1 | 6/2004 | Maruo et al. |
| 7,023,858 B2 | 4/2006 | Ozawa et al. |
| 7,043,750 B2 | 5/2006 | Ina |
| 7,250,987 B2 * | 7/2007 | Goyal et al. .......... 348/725 |
| 7,940,337 B2 * | 5/2011 | Goyal et al. .......... 348/725 |
| 2002/0089605 A1 | 7/2002 | Min |
| 2002/0106018 A1 * | 8/2002 | D'Luna et al. ........ 375/240.01 |
| 2003/0118181 A1 | 6/2003 | Miwa |
| 2004/0230997 A1 | 11/2004 | Kaylani |

OTHER PUBLICATIONS

Motorola, Cable Operator Deployment of CableCARD/Host Application Note Oct. 2003, pp. 1-13.

European Search Report for European Application No. 05001706, Filed Jan. 27, 2005.

* cited by examiner

METHOD AND SYSTEM FOR AN INTEGRATED VSB/QAM/NTSC/OOB PLUG-AND-PLAY DTV RECEIVER

CROSS-REFERENCE TO RELATED APPLICATIONS/INCORPORATION BY REFERENCE

This application is a continuation of U.S. application Ser. No. 11/764,515 filed Jun. 16, 2007 now U.S. Pat. No. 7,940,337, which is a continuation of U.S. application Ser. No. 10/774,037 filed Feb. 6, 2004 (now U.S. Pat. No. 7,250,987).

FIELD OF THE INVENTION

Certain embodiments of the invention relate to television receiver systems. More specifically, certain embodiments of the invention relate to a method and system for a vestigial side band (VSB), quadrature amplitude modulation (QAM), NTSC, out-of-band (OOB) receiver.

BACKGROUND OF THE INVENTION

Digital television, popularly referred to as DTV, is an enhanced television system capable of transmitting and receiving digitized signals, displaying digital images and playing digital audio. While some of these features may be present in current analog television systems such as national television standards committee (NTSC), sequential couleur avec memoire (SECAM) and phase alternate line (PAL), the combination of digitized transmission, reception, video and audio distinguishes digital television from current analog television systems.

Digital television employs various digital signal processing techniques and utilizes scarce bandwidth in a more spectrally efficient manner to transport and present audio and video signals in a way that is superior to current analog television systems. In this regard, digital television allows more channels containing more information to be broadcasted within an equivalent bandwidth utilized by current analog television systems. Accordingly, any excess bandwidth can be re-allocated for use by other types of communication systems. Broadcasters utilizing digital television systems are therefore, capable of providing over-the-air television signals containing higher picture resolutions than current analog broadcast television systems. Broadcasters utilizing digital television systems may also have the capability to provide multicasting and datacasting services using the same bandwidth allocated for conventional analog television systems. For these reasons, Congress mandated that current broadcast television service must, in time, be completely converted to digital television.

While digital television (DTV) utilizes the same broadcast very high frequency (VHF) spectral band and ultra-high frequency spectral (UHF) band as conventional television broadcasting systems, digital television utilizes different modulation techniques than conventional analog television broadcasting systems. Conventional analog television broadcasting systems modulate video using amplitude modulation (AM) and the accompanying audio is modulated using frequency modulation (FM). DTV utilizes a plurality of modulation techniques for transmitting and receiving packetized digital signals. In the United States of America, an eight level vestigial sideband (VSB) modulation scheme is utilized. In some regions of Europe and Asia, for example, coded orthogonal frequency division multiplexing is the modulation scheme of choice. On the other hand, digital satellite systems (DSS) utilize quadrature phase shift keying, while cable television (CATV) system utilizes quadrature amplitude modulation (QAM).

In the United States, a plurality of broadcast formats promulgated by the Advanced Television Standards Committee (ATSC) has been adopted for DTV applications. Some of these formats comprise progressive-scan video comprising 480 scan lines referred to as 480p, interlaced 4:3 video having 480 scan lines referred to as 480i, interlaced video having 1080 scan lines referred to as 1080i and progressive-scan video having 720 scan lines referred to as 720p. Standard definition (SD) television (SDTV) utilizes the interlaced 480i and progressive 480p formats. The picture quality provided by SDTV is comparable in certain respects to conventional NTSC 525 lines systems. High definition (HD) television (HDTV) utilizes the interlaced 1080i and progressive 720p formats in a 16:9 aspect ratio. The resolution of the HDTV interlaced 1080i and progressive 720p formats may be converted to lower resolution such as the interlaced 480i and progressive 480p formats provided by SDTV.

In the US for example, DTV signals are modulated on an RF carrier using 8-level VSB or 8VSB, and transmitted in a six (6) MHz channel as compressed 4:2:0 MPEG-2 formatted packetized streams. These packetized streams contain both audio and video information. For this reason, a conventional analog system is unable to receive a transmitted DTV signal. In order to decode a received 8-level VSB signal, an ATSC-compliant DTV receiver or a set-top box is required.

FIG. 1 is a block diagram of a conventional digital television (DTV) receiver. Referring to FIG. 1, the receiver 100 comprises an antenna 102, a tuner 104, a demodulator block 106, an equalizer 110, a phase tracking block 112, a trellis decoder 114, a de-interleaver 116, a Reed Solomon (RS) decoder 118 and a de-randomization block 120.

The antenna 102 is coupled to the tuner 104, which is adapted to receive 6 MHz VHF or UHF signals. The tuner 104 includes a band pass filter that passes signals in the range of about 50 MHz to about 810 MHz, thereby rejecting any unwanted signals. The demodulator block 106 is adapted to receive and process NTSC signals and may include circuitry that is utilized to mitigate the effects of co-channel interference. The equalizer 110 is adapted to compensate for linear distortions that may have occurred during transmissions. The phase tracking block 112 may be utilized to track and eliminate unwanted noise. The trellis decoder 114 reduces co-channel interference and impulse noise. The de-interleaver 116 and the Reed Solomon (RS) decoder 118 may cleanup the signal and remove any unwanted burst interference that may affect image quality. The trellis decoder 114, de-interleaver 116 and the Reed Solomon decoder 118 significantly reduces errors that may occur in the received signal. The de-randomization block 120 is configured to receive the error corrected signal from the Reed Solomon decoder 118 and de-randomizes the error corrected signal using the same pseudorandom sequence utilized to randomize the original signal during transmission.

The receiver of FIG. 1 is adapted to receive and demodulate only 8-level VSB modulated signals. In most instances, the tuner 104, filter block 106, equalizer 110, phase tracking block 112, trellis decoder 114, de-interleaver 116, Reed Solomon (RS) decoder 118 and de-randomization block 120 are integrated into a plurality of integrated circuits (ICs) which have to be coupled together by suitable circuitry and/or logic. Accordingly, any receiver implementation utilizing these integrated circuits would require a significant investment in scare and expensive printed circuit board (PCB) real estate and complex design layouts. Even in instances where most of the components of FIG. 1 are integrated in a few integrated circuits, the resulting receiver is limited to North American digital terrestrial broadcast television signals. Furthermore, with the promulgation of standards such as the CableCard specification, any out-of-band signal processing would require additional ICs and/or circuitry to handle out-of-band signal processing. This would further require the use of additional PCB real estate, further increasing cost and design complexity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for processing television signals. Aspects of the method may comprise receiving an inband signal by a single chip integrated DTV receiver and demodulating the received signal within the single chip DTV receiver. An out-of-band signal corresponding to the received inband signal may be received and processed on-chip by said single chip integrated DTV receiver. The received inband signal may be a VSB signal, a NTSC signal, or a QAM signal, for example. If the received inband signal is a VSB signal, the demodulated received inband signal may be error corrected within the single chip integrated DTV receiver to generate an error corrected ATSC compliant signal. If the received inband signal is a QAM signal, the demodulated received inband signal may be error corrected within the single chip integrated DTV receiver to generate an error corrected ITU-T J.83 signal which is compliant with Annex A, Annex B and/or Annex C of ITU-T J.83. If the received inband signal is a VSB signal, the error corrected ATSC signal may be equalized within the single chip integrated DTV receiver. If the received inband signal is a QAM signal, the error corrected ITU-T J.83 compliant signal may be equalized within the single chip integrated DTV receiver.

An output MPEG transport stream may be generated from the demodulated received inband signal within the single chip integrated DTV receiver. The MPEG transport stream may be a serial or parallel MPEG transport stream. If the received inband signal is an NTSC signal, the demodulated received inband signal may be decoded within the single chip integrated DTV receiver. An $I^2S$ audio output, a stereo audio output, a monaural audio output, and/or a multiplexed baseband audio output may be generated from the decoded demodulated received inband signal from within the single chip integrated DTV receiver. If the received signal is an NTSC signal, a composite NTSC signal may be generated from the demodulated received inband signal within the single chip integrated DTV receiver. The received out-of-band signal may be demodulated within the single chip integrated DTV receiver using for example, a QPSK demodulator. The demodulated received out-of-band signal may also be error corrected within the single chip integrated DTV receiver. An output out-of-band transport stream may be generated from the processed received out-of-band signal from within the single chip integrated DTV receiver. The out-of-band transport stream comprises CableCard encryption and security data. Demodulation of the received inband signal and/or the out-of-band received signal may be controlled via an on-chip processor integrated within the single chip integrated DTV receiver.

Another embodiment of the invention may provide a machine-readable storage, having stored thereon, a computer program having at least one code section executable by a machine, thereby causing the machine to perform the steps as described above for processing television signals.

Aspects of the system for processing television signals may comprise an inband analog front end integrated in a single chip integrated DTV receiver that receives an inband signal. A demodulator within the single chip DTV receiver may demodulate the received inband signal. An out-of-band analog front end integrated within the single chip integrated DTV receiver may be adapted to receive an out-of-band signal corresponding to the received signal. An out-of band receiver integrated within the single chip integrated DTV receiver may process the received out-of-band signal. The received inband signal may be a VSB signal, a NTSC signal, or a QAM signal, for example.

An ATSC FEC may be utilized to error correct the demodulated received inband signal within the single chip integrated DTV receiver and consequently generate an error corrected ATSC compliant signal, if the received inband signal is a VSB signal. An ITU-T J.83 compliant FEC may be utilized to error correct the demodulated received inband signal within the single chip integrated DTV receiver and consequently generate an error corrected ITU-T J.83 compliant signal if the received inband signal is a QAM signal. The ITU-T J.83 compliant signal may be compliant with Annex A, Annex B and/or Annex C of ITU-T J.83 specification. At least one equalizer may equalize the error corrected ATSC signal within the single chip integrated DTV receiver if the received inband signal is a VSB signal. The equalizer may be utilized to equalize the error corrected ITU-T J.83 compliant signal within the single chip integrated DTV receiver if the received inband signal is a QAM signal.

The system may further comprise an inband output interface that generates from within the single chip integrated DTV receiver, an output MPEG transport stream from the demodulated received inband signal. The output MPEG transport stream may be a serial or parallel MPEG transport stream. A BTSC decoder may decode the demodulated received signal within the single chip integrated DTV receiver if the received inband signal is an NTSC signal. A least one of the BTSC decoder and an audio DAC may generate from within the single chip integrated DTV receiver, an $I^2S$ audio output, a stereo audio output, a monaural audio output, and/or a multiplexed baseband audio output from the decoded demodulated received inband signal. A DAC may generate a composite NTSC signal from the demodulated received inband signal within the single chip integrated DTV receiver if the received inband signal is an NTSC signal.

A demodulator, for example, a QPSK demodulator may be utilized to demodulate the received out-of-band signal within the single chip integrated DTV receiver. A DVS-167 compliant FEC and/or a DVS-178 compliant FEC may error correct the demodulated received out-of-band signal within the single chip integrated DTV receiver. An out-of-band output interface may generate an output out-of-band transport stream from the processed received out-of-band signal from within the single chip integrated DTV receiver. The out-of-band transport stream may comprise CableCard encryption and security data. An on-chip processor may control demodulating of the received inband signal and/or the received out-of band signal within the single chip integrated DTV receiver These and other advantages, aspects and novel features of the present invention, as well as details of an illustrated embodiment thereof, will be more fully understood from the following description and drawings.

DETAILED DESCRIPTION OF THE INVENTION

Figure 1:
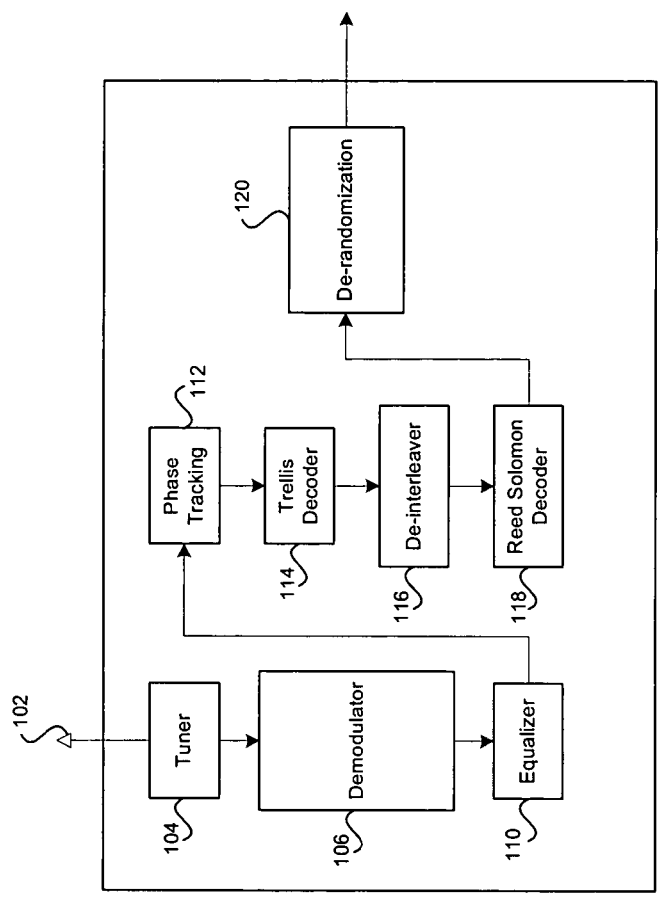
FIG. 1 is a block diagram of a conventional digital television (DTV) receiver.

Certain embodiments of the invention may be found in a method and system for a vestigial side band (VSB), quadrature amplitude modulation (QAM), NTSC, out-of-band (OOB) receiver which is integrated in a single chip. For brevity, the single chip vestigial side band (VSB), quadrature amplitude modulation (QAM), NTSC, out-of-band (OOB) receiver may be referred to as a single chip integrated DTV receiver. In one aspect of the invention, the single chip integrated DTV receiver provides plug and play DTV receiver capability for handling both North American digital cable television and digital terrestrial broadcast television compatible systems. Accordingly, the single chip integrated DTV receiver is capable of receiving all standard-definition and high-definition digital formats (SDTV/HDTV). Furthermore, integrated within the single chip integrated DTV receiver is an NTSC demodulator compatible with the NTSC video standard. An output of the NTSC demodulator may be directed to an external broadcast television system committee (BTSC) or Zweiton M decoder, or it may be sent to an on-chip audio decoder. The on-chip audio decoder may be fully compliant with the BTSC audio standard. The single chip integrated DTV receiver may also comprise an integrated out-of-band QPSK receiver, which may be adapted to, for example, handle a CableCard compliant with the CableCard Specification.

A CableCard, commonly referred to as point-of-deployment (POD) removable security module, is a module that may be utilized to enable portability. In this regard, the CableCard ports certain features and functionalities of a set-top box including encryption, security, and other private network features, onto a removable device or media. The removable device or media may be similar in size to, for example, a personal computer memory card international association (PCMCIA) card. The CableCard may be inserted or plugged into a host device such as a set-top box or DTV receiver, and may provide conditional access (CA) functionality. The conditional access functionality may be utilized to decrypt encrypted digital content received by the host system such as the DTV receiver. The CableCard permits an owner of a receiver to move from a first service provider to a second service provider without having to purchase a new receiver for use with the second service provider. In this regard, when the owner of the receiver switches service to the second service provider, only the CableCard needs to be replaced or updated with relevant information for the second service provider.

A QAM demodulator and a VSB demodulator integrated within the single chip integrated DTV receiver may be referred to as an integrated digital receiver. An analog front end (AFE) integrated within the single chip integrated DTV receiver may be adapted to receive an analog signal centered at the standard television image (IF) frequencies. The analog front end may be adapted to amplify and digitize the received analog signals using an integrated programmable gain amplifier and an A/D converter. The output of the A/D converter may be transferred to the integrated DTV receiver, which comprises the QAM demodulator and the VSB demodulator. Each of the QAM demodulator and VSB demodulator may comprise one or more adaptive filters which are configured to remove or otherwise mitigate the effects of multi-path propagation, NTSC co-channel interference and RFI interference.

The output of the VSB demodulator may be transferred to an ATSC A/53 coding forward error corrector (FEC), with integrated trellis and Reed Solomon decoder. The output of the QAM demodulator may be transferred to an ITU-T J.83 Annex A/B/C coding forward error corrector (FEC). The outputs from the ATSC A/53 coding forward error corrector and the ITU-T J.83 Annex A/B/C coding forward error corrector may be transferred in either a parallel or serial MPEG-2 transport format. The NTSC demodulator may be adapted to filter and demodulate the analog NTSC and FM audio signals and delivers a composite output via an on-chip DAC.

An IF modulated audio output may also be provided via a second on-chip DAC. An on-chip or integrated BTSC decoder may be configured to handle the decoding of baseband multiplexed audio from the NTSC demodulator providing, for example, a stereo Left/Right (L/R), monaural, or separate audio programming (SAP) output via a pair of high precision audio DACs. The gain, clock, carrier, acquisition and tracking loops may be integrated on-chip since the necessary phase-locked loops (PLLs) may be referenced to a single external crystal coupled to an on-chip master phase lock loop (PLL). Chip configuration, channel acquisition and performance monitoring functions may be handled by an on-chip acquisition processor using various software code or applications.

Figure 2A:
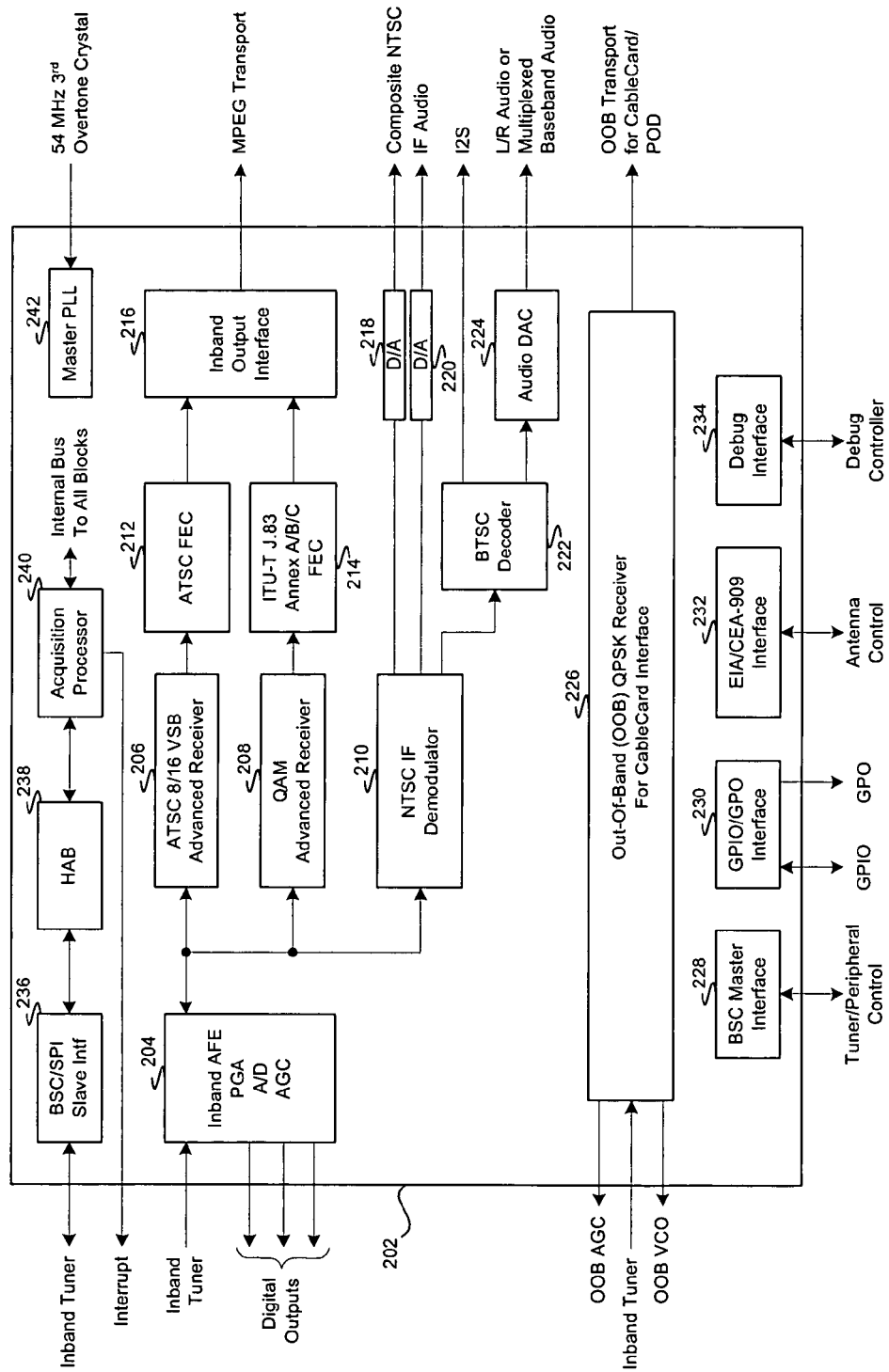
FIG. 2a is a function block diagram of a single chip integrated DTV receiver in accordance with an embodiment of the invention.

FIG. 2a is a function block diagram of a single chip integrated DTV receiver in accordance with an embodiment of the invention. Referring to FIG. 2a, the single chip integrated DTV receiver 202 may comprise an inband analog front end (AFE) block 204, an ATSC 8/16 VSB advanced receiver block 206, a QAM advanced receiver block 208, a NTSC IF demodulator block 210, an ATSC forward error correction (FEC) block 212, an ITU-T J.83 annex A/B/C compliant forward error correction (FEC) block 214, an inband output interface block 216, D/A converter blocks 218 and 220, a BTSC decoder block 222, and an audio DAC block 224. Also illustrated in FIG. 2a is an out-of-band (OOB) QPSK receiver for CableCard interface block 226, a BSC master interface block 228, a general purpose input/output (GPIO)/general purpose output (GPO) interface block 230, an EIA/CEA-909 compliant interface block 232, and a debug interface block 234. The single chip integrated DTV receiver 202 illustrated in FIG. 2a may also comprise a BSC/SPI slave interface block 236, a host access buffer (HAB) block 238, an acquisition processor 240 block, and a master PLL block 242.

Figure 2B:
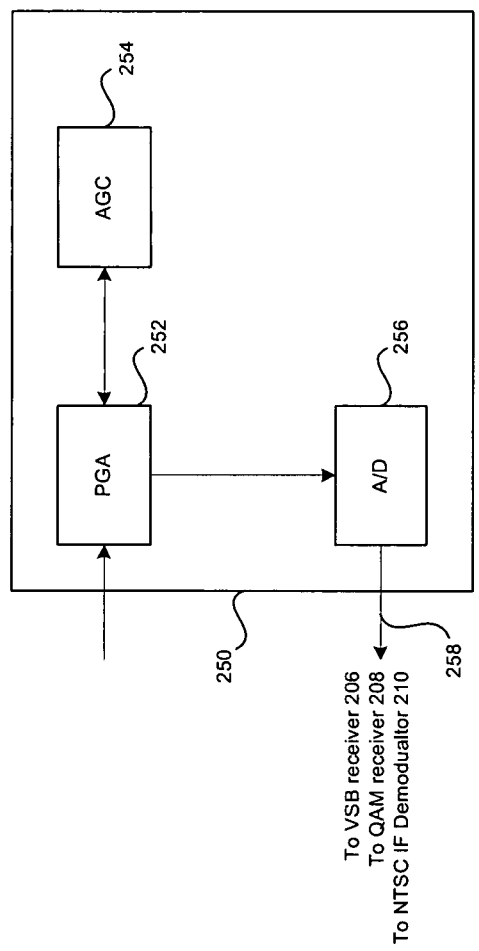
FIG. 2b is a block diagram of the inband analog front end block 204 of FIG. 2a in accordance with an embodiment of the invention.

FIG. 2b is a block diagram of the inband analog front end block 204 of FIG. 2a in accordance with an embodiment of the invention. Referring to FIG. 2b, the inband analog front end block 250 may comprise a programmable gain amplifier (PGA) block 252, an automatic gain control block (AGC) 254 and an analog-to-digital (A/D) converter 256. The automatic gain control block 254 may comprise a digital AGC circuit which may be adapted to control or adjust various power levels seen by the QAM receiver 208, VSB receiver 206 and NTSC demodulator 210 all shown in FIG. 2a. Adjustment of these voltage levels may be utilized to remove or otherwise mitigate the effects of any amplitude variation in the signals entering the single chip integrated DTV receiver. Adjustment of these voltage levels may also provide an optimal loading of the A/D converters in the inband analog front end block 250.

The sigma-delta DACs are adapted to provide a fairly simple mechanism to transfer a digital value into the analog domain. The output of the DAC is a pulse code modulated (PCM) representation of a control word which may be provided as an input to the sigma-delta DACs. An external low pass filter or integrator coupled to an output of a DAC may be utilized to integrate the output of the DAC in order to remove unwanted high frequency components. Accordingly, the analog voltage resulting from the low pass filter and/or integrator may be proportional to the two's complement control word.

The inband analog front end (AFE) block 250 may be configured to receive analog signals at the common IF center frequencies. The internal programmable gain amplifier 252 provides gain to adjust the incoming signal level. The gain based on a closed loop automatic gain control.

The 8/16 VSB receiver block 206, the QAM advanced receiver bock 208, and the NTSC IF demodulator block 210 along with its associated BTSC decoder block 222 may be referred to as an inband receiver. In accordance with an embodiment of the invention, a single A/D converter output from the inband analog front end block may feed each of the three receivers comprising the inband receiver. Accordingly, only one of the three receivers comprising the inband receiver may be operational at any given time.

The ATSC A/53 Digital Television Standard was developed by the Digital HDTV Grand Alliance of vendors and is the accepted standard for the terrestrial transmission of SDTV and HDTV signals in the United States. The ATSC A/53 Digital Television Standard is based on an 8-level vestigial sideband (8-VSB) trellis coded modulation format with a nominal payload data rate of about 19.4 Mbps in a 6 MHz channel. A high data rate mode for use in a cable television environment is also specified by the standard, which utilizes 16-VSB to provide a payload data rate of 38.8 Mbps in a 6 MHz channel. This mode is also compliant with Annex D of the ITU-T J.83 specifications. The ATSC 8/16 VSB advanced receiver 206 in the single chip integrated DTV receiver 202 is compliant with the ATSC A/53 Digital Television Standard's normal mode and high data rate mode.

Figure 2C:
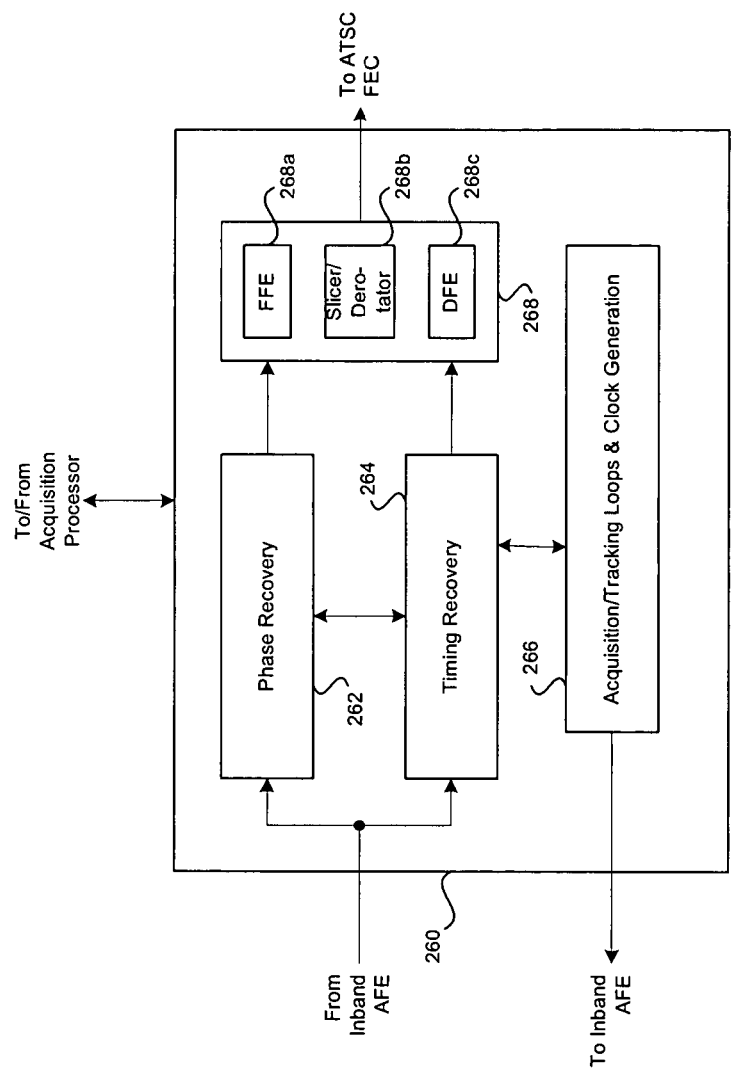
FIG. 2c is a block diagram of the 8/16 VSB advanced receiver block 206 of FIG. 2a in accordance with an embodiment of the invention.

FIG. 2c is a block diagram of the 8/16 VSB advanced receiver block 206 of FIG. 2a in accordance with an embodiment of the invention. Referring to FIG. 2c, the 8/16 VSB advanced receiver block 260 may comprise a phase recovery block 262, a timing recovery block 264, an acquisition/tracking loops and clock generation block 266, and output processing block 268. The output processing block 268 may comprise a feed forward equalizer (FFE) block 268a, a decision feedback equalizer (DFE) 268c and a slicer derotator block 268b.

For carrier recovery, carrier frequency/phase recovery and tracking loops in the phase recover block 262 of the 8/16 VSB advanced receiver block 206 may be all-digital loops that simultaneously provide a wide acquisition range and a large phase noise tracking capability. The loops may be configured to utilize both pilot tracking and decision directed techniques to estimate the angle and direction for phase/frequency compensation. The loops may be filtered by integral-plus-proportional filters in which the integrator and linear coefficients of the filter are programmable in order to establish loop bandwidths. The single chip integrated DTV receiver 202 may provide loop monitoring by utilizing suitable logic, circuitry and/or code, which may be configured to read associated values from the integrators.

A timing recovery loop in the timing recovery block 264 of the ATSC 8/16 VSB advanced receiver 206 comprises a timing error discriminant, a loop filter, and a digital timing recovery block that controls a digital resampler. The timing error discriminant may be adapted to output a new value for each symbol that is filtered by a digital integral-plus-proportional lowpass filter with programmable coefficients. In one aspect of the invention, the loop integrator may be read for loop monitoring or written for direct control by the acquisition processor block 240. For an oversampled data stream, at least a portion of the upper bits of the loop filter may be applied to a digital resampling filter that correctly reconstructs sampled data from the oversampled data stream.

In a terrestrial broadcast environment, radio frequency interference (RFI) and co-channel interference from an NTSC transmitter is generally a potential problem which degrades the quality of a received signal. The ATSC 8/16 VSB advanced receiver 206 comprises an adaptive filter which is configured to mitigate the effects of co-channel interference. In this regard, the adaptive filter places notches in the frequency spectrum at the locations of the detected NTSC luma, color, and audio subcarriers. In an aspect of the invention, the adaptive filter may place notches in the frequency spectrum to detect and cancel narrowband interferers.

While square-root Nyquist filters (not shown) in the 8/16 VSB advanced receiver 260 will assure that there is no intersymbol interference (ISI) over a perfect channel, they cannot remove ISI due to imperfections in the channel characteristics. Accordingly, the ATSC 8/16 VSB advanced receiver 260 utilizes the feed forward equalizer (FFE) block 268a and decision feedback equalizer block 268c to mitigate amplitude and phase distortion resulting from ISI generated by terrestrial broadcast channels with varying multipath spreads. In addition to adaptive equalization, the decision feedback equalizer (DFE) block 268c may also perform phase recovery on the equalized constellation points by using a quadrature synthesizer and complex mixer under the control of the carrier recovery loop to track out residual carrier offsets and instantaneous phase offsets.

The QAM advanced receiver block 208, may be adapted to support QAM demodulation and may accept an analog signal centered at the standard television IF frequencies, and amplify and digitize this signal utilizing an integrated programmable gain amplifier and an A/D converter. The QAM advanced receiver block 208 demodulates, match filters, and then adaptively filters the signal to remove multipath propagation effects and narrowband co-channel interference. Integrated trellis and Reed-Solomon decoders in the QAM advanced receiver block 208 are adapted to support the IUT-T J.83 Annex A/B/C coding formats for error correction. The output data stream from the QAM advanced receiver block 208 may be formatted and delivered in serial MPEG-2 transport format. Clock, carrier and gain acquisition and tracking loops are integrated on-chip as are the necessary phase-locked loops, all of which may be referenced to a single external crystal coupled to the master PLL block 242.

The QAM advanced receiver block 208 may operate in any of a plurality of standardized modes such as the CATV ITU-T J.83 Annex A/C mode. The ITU-T J.83 Annex A/C standard is utilized primarily outside the United States for digital cable television applications. In Europe, the ITU-T J.83 Annex A/C standard is known as the Digital Video Broadcast for Cable (DVB-C) standard. The Digital Audio-Visual Council (DAVIC) has adopted the DVB-C standard along with various extensions to support 256-QAM. The IEEE 802.14 committee has adopted Annex A/C as one of two possible physical layer standards for cable modems. Notwithstanding, the QAM advanced receiver block 208 provides support for the full standard, including up to 8 MHz channelization, as described in ITU-T J.83 Annex A and C, as well as all DAVIC extensions.

The QAM advanced receiver block 208 may also be adapted to operate in a ITU-T J.83 Annex B mode, and provides support for ITU-T J.83 Annex B standard, which is currently the dominant standard for digital television delivery over CATV networks in the United States. ITU-T J.83 Annex B has been adopted as the physical layer standard by various organizations such as the Society of Cable Telecommunications Engineers (SCTE DVS-031), the Multimedia Cable Network Systems (MCNS-DOCSIS), and the IEEE 802.14 committee.

Figure 2D:
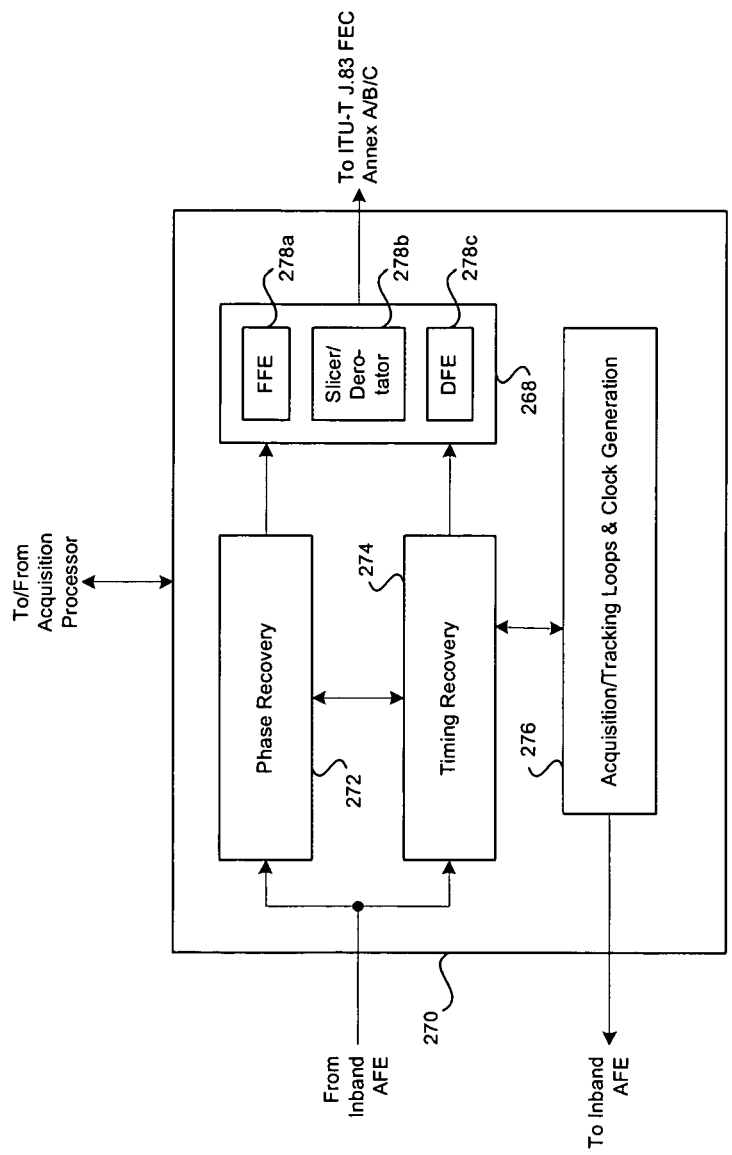
FIG. 2d is a block diagram of the QAM advanced receiver block 208 of FIG. 2a in accordance with an embodiment of the invention.

FIG. 2d is a block diagram of the QAM advanced receiver block 208 of FIG. 2a in accordance with an embodiment of the invention. Referring to FIG. 2d, the QAM advanced receiver block 270 may comprise a phase recovery block 272, a timing recovery block 274, an acquisition/tracking loops and clock generation block 276, and output processing block 278. The output processing block 278 may comprise a feed forward equalizer (FFE) block 278a, a decision feedback equalizer (DFE) 278c and a slicer derotator block 278b.

For carrier recovery, carrier frequency/phase recovery and tracking loops in the QAM advanced receiver block 270 may be all-digital loops that may be adapted to simultaneously provide a wide acquisition range and a large phase noise tracking capability. The loops may be configured to utilize decision directed techniques to estimate the angle and direction for phase/frequency compensation. The loops may be filtered by integral-plus-proportional filters in which the integrator and linear coefficients of the filter are programmable in order to establish and manage loop bandwidths. Data from the loop filter may be utilized to control direct digital frequency synthesizers, providing both extremely accurate frequency generation and fine phase resolution. The QAM advanced receiver block 270 may provide loop monitoring by utilizing suitable logic, circuitry and/or code, which may be configured to read associated values from the integrators.

A timing recovery loop in the timing recovery block 274 of the QAM advanced receiver block 270 comprises a timing error discriminant, a loop filter and a digital timing recovery block that controls a digital resampler. The timing error discriminant may be adapted to output a new value for each symbol that is filtered by a digital integral-plus-proportional lowpass filter having programmable coefficients. In one aspect of the invention, the loop integrator may be read for loop monitoring by the acquisition processor block 240. For an oversampled data stream, data from the loop filter may be applied to a digital resampling filter that reconstructs correctly sampled data from the oversampled data stream.

In cable TV systems, inter-modulation products resulting from analog CATV channels may cause narrowband co-channel interference. Accordingly, the QAM advanced receiver block 270 may comprise an adaptive filter that places notches in the frequency spectrum at the location of these sub-carriers. The use of the adaptive filter mitigates the effects of inter-modulation products.

The phase recovery block 272 in the QAM advanced receiver block 270 may be adapted to perform phase recovery on equalized constellation points by utilizing, for example, a quadrature synthesizer and complex mixer. A carrier recovery loop may be utilized to track out residual carrier offsets and instantaneous phase offsets. The QAM advanced receiver block 270 may also comprise square-root Nyquist filters (not shown) which are configured to mitigate some of the effects of inter-symbol interference (ISI). While the square-root Nyquist filters will ensure that there is no inter-symbol interference (ISI) over a perfect channel, they cannot remove ISI caused by imperfections in the characteristics of a channel. Accordingly, the QAM advanced receiver block 270 utilizes the feed forward equalizer block (FFE) 278a and the decision feedback equalizer (DFE) block 278c which is sufficient to remove the ISI generated by worst-case coaxial cable channels with varying multipath spreads. In an aspect of the invention, blind convergence algorithms may be provided to facilitate equalizer acquisition.

The ITU-T J.83 annex A/B/C compliant forward error correction (FEC) block 214, which may also be referred to as the A/53 FEC decoder 214, comprises a trellis decoding function, a convolutional deinterleaving function, Reed-Solomon decoding function and derandomization function. The A/53 FEC decoder block 214 may be adapted to receive soft decisions from the 8/16-VSB receiver and locate corresponding segments and field synchronization signals. In the case of 8 VSB, received data may be passed through a trellis decoder, which may be adapted to function as a maximum likelihood sequence estimator (MLSE). For both 8-VSB and 16-VSB, the data then passes through a convolutional deinterleaver and into a Reed-Solomon (RS) decoder that is capable of correcting a plurality of symbol errors per RS block. The resulting data may then be derandomized and transferred to the output as, for example, an MPEG-2 serial or parallel formatted data stream comprising packet sync and a data clock. The A/53 FEC decoder block 214 may also be configured to signal the presence of an uncorrectable error by setting an enabled transport error indicator (TEI) flag in the output MPEG-2 data stream.

The ITU-T J.83 Annex A/B/C FEC block 214 integrated in the single chip integrated DTV receiver 202 may be coupled to an input of the output processing block 278. The ITU-T J83 Annex A/B/C FEC is compatible with all common CATV standards. The ITU-T J.83 Annex A/B/C FEC block 214 may comprise and internal memory, which may be adapted to support commonly utilized interleaver depths characteristic of cable systems.

ITU-T J83 Annex B decoder support may be provided through a concatenated coding scheme comprising trellis decoding, derandomization, convolutional deinterleaving, Reed-Solomon (RS) decoding, and checksum decoding. This concatenated coding scheme along with interleaving provides superior coding gain to combat gaussian noise while still offering good protection against burst errors. An ITU-T J83 Annex B compliant decoder may be integrated in the ITU-T J.83 Annex A/B/C FEC block 214. A trellis decoder may be provided and is configured to function as a maximum likelihood sequence estimator (MLSE) by receiving and processing soft decisions from the equalizer block 278*a* and/or 278*c*. Resulting output sequences from the trellis decoder may be transferred to a frame synchronization block and a derandomization block for processing. Output data from the synchronization block may be transferred to a Reed-Solomon decoder which may be configured to correct, for example, 3 symbol errors per RS block. A final stage in the ITU-T J83 Annex B compliant decoder may provide checksum decoding. This type of processing provides an accurate way for detecting blocks containing uncorrectable errors. The ITU-T J.83 Annex A/B/C FEC block 214 may be adapted to identify and report uncorrectable errors by setting a transport error indicator (TEI) flag when the flag is when enabled in the MPEG-2 stream.

ITU-T J83 Annex A/C compliant decoder support may be provided through function such as frame synchronization, convolutional deinterleaving, Reed-Solomon error correction, and derandomization. A frame synchronization block may be adapted to receive hard decisions from the output processing block 270 and lock onto an inverted sync byte pattern. In an aspect of the invention, frame synchronization acquisition and retention characteristics may be set via a host interface.

Once synchronized, a convolutional deinterleaver having programmable depths may employ a Ramsey Type III approach to deinterleave data. After deinterleaving, resulting data symbols may be transferred to the Reed-Solomon decoder which may be adapted to correct, for example, up to 8 symbol errors per RS block. The resulting error corrected output may be derandomized in order to undo the randomization inserted during transmitter modulation. A resulting output signal may comprise serial or parallel MPEG-2 data with packet sync and a data clock. The Annex ITU-J.83A/C FEC block 214 may report uncorrectable errors by setting a transport error indicator (TEI) flag if the flag is enabled in the MPEG-2 stream.

Figure 2E:
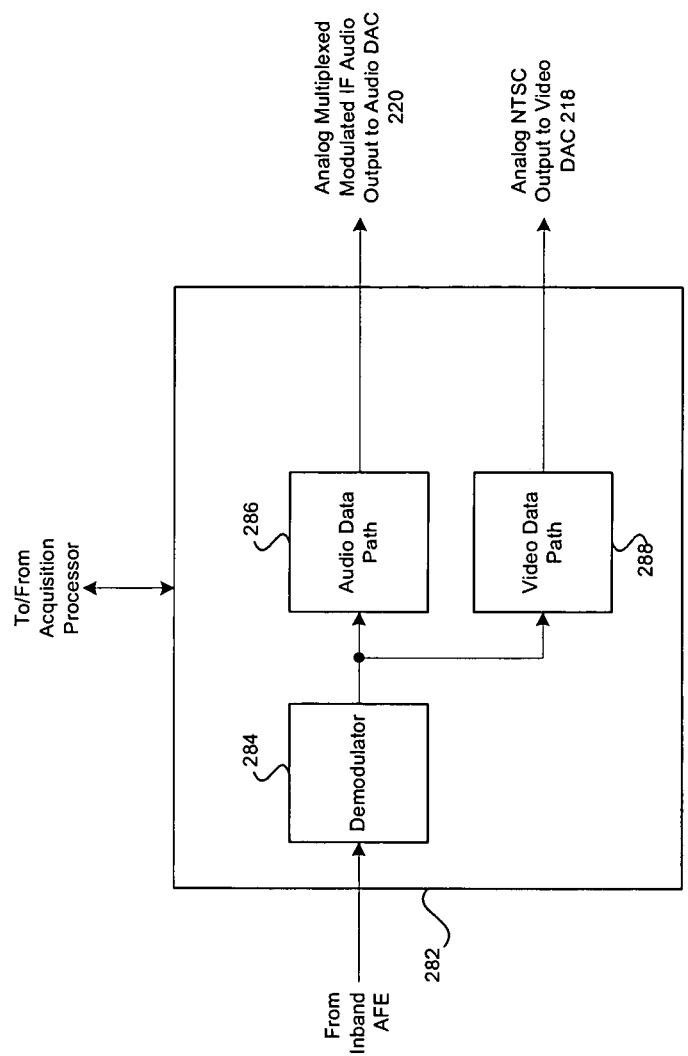
FIG. 2e is a functional block diagram of the NTSC IF demodulator block 210 of FIG. 2 in accordance with an embodiment of the invention.

The NTSC IF demodulator (IFD) block 210 may be adapted to receive and process analog NTSC IF television signals and generate an output digital baseband composite video broadcasting signal (CVBS) or an output digital audio signal which may be either a monaural signal or a BTSC baseband multiplex signal. FIG. 2*e* is a functional block diagram of the NTSC IF demodulator block 210 of FIG. 2*a* in accordance with an embodiment of the invention. Referring to FIG. 2*e*, the NTSC IF demodulator block 282 may comprise a demodulator block 284, an audio data path block 286, and a video data path block 288. The output of the audio data path block 286 is an analog multiplexed modulated IF audio output and the output of the video data path block 288 is an NTSC output.

The demodulator block 284 is adapted to receive an output signal from the inband analog front-end 204, which may be transferred to a digital mixer in the demodulator block 284. The digital mixer may convert the IF data in the output signal from the inband analog front-end 204 to a complex baseband data stream. A pilot recovery loop may be utilized to control operation of the digital mixer. The output of the digital mixer may be filtered and tranferred to audio data path block 286.

The audio data path block 286 comprises a complex mixer, a filter-and-decimate stage, and frequency demodulation stage. The complex mixer may translate a FM audio carrier, for example, a 4.5 MHz NTSC carrier to a baseband signal. The filter-and-decimate stage is adapted to remove the video from the signal and reduce its sampling rate. The resulting decimated signal may be frequency demodulated to produce a monaural or a baseband BTSC multiplexed signal.

The video data path block 288 comprises a Nyquist filter, a group delay filter, an audio trap filter, and a gain/DC-level compensation block. The Nyquist filter may be configured to perform the Nyquist shaping, which is traditionally done by a SAW filter at IF. The group-delay filter provides group delay compensation within a specified FCC mask. The audio trap filter may remove the audio signal from the video signal. Different audio trap filters may be implemented for different audio carrier locations. The gain/DC-level compensation block may acquire AGC and DC-level information from a video decoder and adjust the signal accordingly so as to attain the proper signal loading and DC-level for the composite video broadcasting signal (CVBS).

The output of the video data path 288 may be routed through a video DAC 218 (FIG. 2*a*), which is integrated in the single chip integrated DTV receiver 202 using, for example, high-speed CMOS DAC technology. This DAC 218 may be configured to support a composite video broadcasting signal (CVBS) output. The multiplexed modulated IF audio output from the audio data path 286 may be adapted to mix the pre-demodulated audio output of the NTSC IF demodulator block 210 up to a programmable IF. The resulting mixed signal may then be routed through a video DAC 220 to generate an IF audio signal. The DAC 220 may be integrated in the single chip integrated DTV receiver 202 using, for example, high-speed CMOS DAC technology. The DAC 220 may also be configured to support a modulated IF audio output.

The inband output interface block 216, is coupled to the ATSC FEC block 212 and the ITU-T J.83 Annex A/B/C FEC block 214 and may be adapted to cleanup signals containing jitter which are received from the ATSC 8/16 VSB advanced receiver block 206 and the QAM advanced receiver block 208, which. Accordingly, the inband output interface block 216 may buffer the outputs from ATSC FEC block 212 and the ITU-T J.83 Annex A/B/C FEC block 214 in, for example, a FIFO buffer. Resulting output data may be read out of the FIFO buffer using a smoothed version of the clock which may be generated by the master PLL block 242. The output clock may be frequency locked with the average of the clock frequencies from the FECs 212, 214. The inband output interface block 216 may also be adapted to format the output of the single chip integrated DTV receiver 202 (FIG. 2*a*) in a serial or parallel MPEG transport data stream. The band output interface block 216 may also perform independent inversion of sync, valid, error and clock, independent suppression of data and/or clock, and/or variable sync and valid duration lengths.

The D/A converter blocks 218 and 220 are integrated into the single chip integrated DTV receiver 202 using high-speed CMOS DAC technology. The DAC 218 is configured to to support a composite video broadcasting signal (CVBS) output. Accordingly, the DAC 218 may generate a composite NTSC output and the DAC 218 is configured to generate an IF audio output.

The BTSC decoder block 222 is coupled to the NTSC IF demodulator block 210 and receives input United States BTSC compliant baseband multiplexed TV audio signals from the NTSC IF demodulator block 210. The BTSC decoder block 222 may be adapted to operate, for example, in a single channel mode supporting a plurality of output rates such as 32 KHz, 44.1 KHz, and 48 KHz I2S outputs. The BTSC decoder block 222 may also be adapted to produce stereo output, single or dual monaural output, or an independent separate audio programming (SAP) output.

The BTSC decoder block 222 may be adapted to function as a digital multi-channel television sound decoder. A baseband analog BTSC composite signal extracted by the NTSC IF demodulator block 210 may be received by the BTSC decoder block 222 and processed fully in digital logic to recover the main left and right channels (L+R), stereo (L/R) channel, or SAP channels. The stereo decoding may include sum (L+R) channel, difference (L−R) channel decoding and rematrixing of sum and difference channel to retrieve left (L) and right (R) channel. The main channel (sum or mono channel) decoding may be processed as a subset of the stereo decoding. The difference channel decoding may comprise pilot tone recovery by using, for example, a PLL, double side band (DSB) demodulation, and low pass filtering of the decoded difference signal. A variable de-emphasis circuit may provide DBX-TV compliant noise reduction. The sum channel decoding may comprise low pass filtering and de-emphasis. A second audio programming (SAP) decoding function may comprise FM demodulation and DBX variable de-emphasis and an integrated power detector may be utilized for pilot tone and SAP FM carrier. The BTSC decoder block 222 may automatically switch between stereo and monaural modes based on a pilot tone power or SAP decoding. Muting may be achieved based on a power associated with the SAP FM carrier.

The decoded PCM output from the BTSC decoder block 222 may be programmed to sampling rates of, for example, 32 KHz, 44.1 KHz, and 48 KHz. These data rates may be supported by the on-chip audio DAC 224. Additionally, the left/right channel PCM can be output digitally through either the $I^2S$ bus or the on-chip Audio DAC.

The audio DAC block 224 may be adapted to generate and analog signal representative of the Left (L) and/or Right (R) audio information received from the BTSC decoder block 222 or a pre-decoded baseband multiplexed audio signal from the NTSC IF demodulator block 210. An analog output from the DAC block 224, which is representative of the pre-decoded baseband multiplexed audio signal from the NTSC IF demodulator block 210, may be utilized by an external BTSC decoder which may be adapted to receive a baseband input.

The audio DACs may upsample and encode the output of the BTSC decoder block 222. The analog data output from the audio DACs is a serial pattern corresponding to a digital input into the audio DAC. The differential output may be filtered through an external low-pass filter to generate analog audio. The input to the audio DAC 224 from the BTSC decoder block 222 may have a sample rate of 48 KHz, 44.1 KHz or 32 KHz. The audio DAC 224 may upsample its input, filter the resulting upsampled data and modulate the left and right portions of the filtered data. Separate left and right mappers may be utilized to convert the digital modulator outputs to serial pulse patterns having different high and low times depending on the modulated value.

Figure 3:
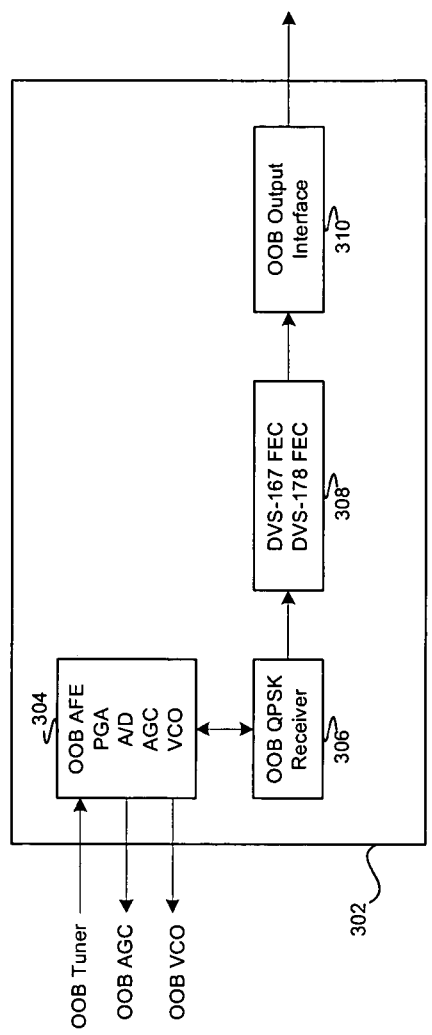
FIG. 3 is a block diagram illustrating the out-of-band (OOB) QPSK receiver for CableCard interface block 226 of FIG. 2a in accordance with an embodiment of the invention.

FIG. 3 is a block diagram illustrating the out-of-band (OOB) QPSK receiver for CableCard interface block 226 of FIG. 2a in accordance with an embodiment of the invention. For brevity, the out-of-band (OOB) QPSK receiver for Cable-Card interface block 226 may be referred to as an out-of-band receiver block 226. Referring to FIG. 3, the out-of-band receiver block 302 may comprise an out-of-band (OOB) analog front end (AFE) 304, an out-of-band (OOB) QPSK demodulator 306, a DVS-167 FEC/DVS-178 FEC block 308 and and out-of-band output interface block 310. The OOB AFE block 304 comprises a programmable gain amplifier, an A/D converter, a automatic gain control and a voltage controlled oscillator (VCO).

The out-of-band receiver block 302 integrated within the single chip integrated DTV receiver 202 may be utilized with an an IF centered signal. The OOB AFE block 304 integrated within the out-of-band receiver block 302 utilizes a frequency agile local oscillator (LO) that may be adapted to down convert any channel in, for example, the 70-150 MHz frequency range to a SAW centered IF. The desired channel may then be sub-sampled by an A/D converter.

The out-of-band QPSK demodulator block 306 may receive an IF sampled input from the A/D converter and down converts the sampled input to baseband with a full quadrature mixer driven by a carrier recovery loop. The resulting true-baseband data stream may be resampled under control of a clock recovery loop to produce a data stream that is correctly sampled in both frequency and phase. The I and Q baseband signal components may then be filtered by dual square-root Nyquist filters.

The out-of-band receiver block 302 may include provisions for, for example, two automatic gain control loops (AGC). The first loop may be closed locally at the programmable gain amplifier and may be referred to as the inner IF loop or the AGC loop. The second loop may be closed at the tuner and may be referred to as the outer tuner loop or the delayed-AGC loop. Accordingly, gain control may be divided between the inner and outer tuner loops. Each loop comprises a power estimate, a threshold comparison and a first order loop filter. The filter output may be utilized to directly control the PGA gain in the case of the inner loop and may be fed into a sigma-delta modulator to generate an analog control voltage in the case of the outer loop.

A baud recovery loop comprising a timing error discriminant, a loop filter and a digital timing recovery block may be utilized to control a digital resampler. The timing error discriminant may be adapted to output a new value for each baud that is filtered by a digital integral-plus-proportional lowpass filter, which features programmable coefficients. The loop integrator may be read in order to provide loop monitoring or written for direct control by the acquisition processor block 240. Data from the loop filter may be applied to a digitally controlled frequency synthesizer that may permit the baud rate to be varied over.

The out-of-band receiver block 302 may comprise out-of-band carrier frequency/phase recovery and tracking loops, which may be all-digital loops that are configured to simultaneously offer a wide acquisition range and a large phase noise tracking capability. The out-of-band carrier frequency/phase recovery and tracking loops may be adapted to estimate the angle and/or direction for frequency/phase compensation. An integral plus-proportional filter may be utilized to filter the out-of-band carrier frequency/phase recovery and tracking loops. The bandwidth of the loop may be adjusted by programming the integrator and linear coefficients of the integral plus-proportional filter. An output of the loop filter may be utilized to control, for example, a derotator. The integrator may be read to provide loop monitoring and/or directly written to provide control by the acquisition processor 240.

The OOB QPSK demodulator block 306 may comprise a decision feedback equalizer (DFE) with feed-forward taps and feedback taps, which may be adapted to remove or otherwise mitigate the effects of ISI generated by worst-case coaxial cable channels including a wide variety of impairments such as un-terminated stubs. The equalizer coefficients may be updated at, for example, every baud cycle to provide fast convergence.

The DVS-167 (DAVIC) FEC/DVS-178 (DIGICIPHERII) FEC block 308, which may also be referred to as an out-of-band FEC block 308, may comprise a frame synchronization function, a deinterleaving function, a Reed-Solomon (RS) decoding function, and a derandomization function. At least some of these functions may be programmable so that the out-of-band FEC block 308 may be adapted to handle both the DigiCipher II and DAVIC out-of-band FEC specifications.

The BSC master interface block 228 may comprise a BSC Interface and a SPI interface. The BSC interface may be adapted to support a BSC operating mode and the SPI interface may be adapted to support a SPI operating mode. The BSC operating mode allows the single chip integrated DTV receiver 202 (FIG. 2a) to be controlled over a serial interface that, may be compatible with at least a subset of the I$^2$C bus. A micro-controller interface comprising a serial data (SDA) signal and serial clock (SCL) signal may be utilized to control a plurality of devices coupled to a common bus. The addressing of the the devices coupled to the common bus may be accomplished through an established protocol on the two-wire interface. The I$^2$C™ interface specifications define a plurality of addressing modes and protocols that may be utilized for multi-master systems and is hereby incorporated herein by reference. In one aspect of the invention, the BSC interface 228 may be configured so that the device coupled to the bus do not respond to a general call addresses. Notwithstanding, the invention is not so limited.

In general, for I$^2$C devices, both the SDA and SCL signals are bi-directional signals with open-drain output drivers. This allows multiple devices to be connected to the bus in a wired AND configuration with external pull-up resistors. In the single chip integrated DTV receiver 202, the SDA signal may be bi-directional, but SCL may be utilized as an input since the single chip integrated DTV receiver 202 may be adapted to operate as a slave device. In normal operation, data transfers may be clocked by the SCL signal with one SCL pulse per bit of data and the SDA signal may be required to be stable when the SCL signal is high. Transitions of SDA while SCL is high are used to signal the interface start (S), stop (P), and repeated start (Sr) conditions. A start condition may be defined as a high-to-low transition of SDA signal while the SCL signal is high. A corresponding stop condition may be defined as a low-to-high transition of SDA signal while the SCL is high. Data transmissions may be preceded by a start condition and and end condition with a stop condition. Repeated starts within a transmission period may be utilized to alter the direction of the data flow, or to change, for example, a register's base address. Data transmission operations may occur in, for example, 8-bit blocks and each block may be acknowledged by a designated receiver through generation of an acknowledge signal (A). The acknowledge signal may be generated on, for example, a ninth pulse of the SCL signal for each block that is transferred. It should be recognized the the signal levels for the operating modes which are referenced herein, may be altered without departing from the various aspects of the invention.

To perform a write operation, a master device on the common bus generates a start condition by pulling the SDA signal low while the SCL signal is high. This signals the single chip integrated DTV receiver to listen on the common bus for its chip address. The master device on the bus may then send, for example, a chip address and a R/W signal. Each slave device on the common bus may then compare the address on the common bus with its own address and acknowledge the master if there is a match between the sent address and the devices' own address. If there is no match, the slave device may ignore the rest of a current transmission. The slave address for the single chip integrated DTV receiver 202 (FIG. 2a) may be programmable via one or more address pins.

In instances where the master device on the common bus writes to the single chip integrated DTV receiver 202, the next byte of data may be interpreted by the chip as a register base address. This may be utilized as the address of the location for storing the next byte of data received. This base address may be incremented as each byte of data is received allowing a contiguous block of registers to be programmed in a single transmission. Non-contiguous blocks may be programmed utilizing multiple transmissions or through the use of a repeated start condition, which allows a new chip address and register base address to be specified without the master device relinquishing bus control. At the end of a transmission, the register base address may point to the last register written. The transmission may be terminated with the receipt of a stop condition.

Read operations may be performed in a somewhat manner similar to a write operation. In this regard, the master device on the common bus may generate a start condition followed by the chip address and R/W signal. If acknowledged, the master device may listen to the SDA signal while generating the SCL signal. After the master device receives a byte, if it wants to receive another byte, it will acknowledge the currently received byte. At the end of a transmission, the master device may not acknowledge the slave and may generate a stop condition to terminate the transmission. The base address register may be utilized to determine a location that is being read, and this address may be incremented with each successive read. At the end of a read operation, the base address may point to the register after the last one read. Since the base address register may be be programmed through a write operation, a general read may require two accesses or a single access with a repeated embedded start in order to change the direction of transmission.

In the SPI operating mode, a pin may be set to logic 1, allowing the single chip integrated DTV receiver 202 to be controlled over a serial interface which may be compatible with at least a subset of the synchronous serial peripheral interconnect (SPI) bus specification. A micro-controller interface may be utilized to control a serial clock (SCK) signal, a slave select (SS) signal, a master-in/slave-out (MISO) signal and a master-out/slave-in (MOSI) signal. Support may be added to facilitate transfers from the single chip integrated DTV reviewer 202. Accordingly, the first two bytes sent to the slave device during a SPI transfer as a command byte may be followed by an address byte, and any remaining bytes may be interpreted as data bytes. The command byte may comprise a 7-bit reserved word followed by a single bit R/W signal which determines the data direction for the transmission. The next byte may be an 8-bit register base address, which may be utilized as the location to store the next byte of data received in the case of a write operation or the next address from which to retrieve data in the case of a read operation. The base address may be incremented as each byte of data gets transmitted or received and this may allow a contiguous block of registers to be stored or read in a single transmission. Non-contiguous blocks may be stored or read through through multiple transmissions, which allow a new command byte and register base address to be specified. The transmission may be terminated by the de-assertion of the slave select signal by the master. The bit assignments are illustrated for exemplary purposed and the invention is not limited in this regard.

The general-purpose input/output (GPIO)/general-purpose output (GPO) interface block 230 may comprise one or more bits of dedicated general-purpose I/O logic (GPIO). Each pin may be individually programmed to be either an input or output via one or more control registers. Each pin may be written or read via one or more control registers. Each pin may be written to or tri-stated via one or more control register. An ownership register may be provided to determine whether a host processor or the acquisition processor 240 has write privileges to associated data in, data out and/or output enable registers. The GPIO/GPO pins in the general-purpose input/output (GPIO)/general-purpose output (GPO) interface block 230 may be shared with out-of-band and audio outputs.

The EIA/CEA-909 compliant interface block 232 comprises an antenna control interface, which is adapted to facilitate optimal television reception. The single chip integrated DTV receiver allows a host system to control the characteristics and/or position of an antenna apparatus in order to optimize reception of a signal by the antenna apparatus. The EIA/CEA-909 compliant interface block 232 has the capability to handle mode A and/or mode B operation. A state machine within the interface determines whether the connected antenna is capable of Mode B operation.

In one embodiment of the invention, the EIA/CEA-909 compliant interface block 232 comprises an antenna detect input pin, a receive data input pin and a transmit data output pin. The antenna detect pin may enable or disable the EIA/CEA-909 compliant interface block 232 whenever an antenna is connected or removed. The receive data input pin may be configured so that it is valid for mode B operation. The receive data is externally buffered data from the antenna. The transmit data pin may be utilized to transfer data from the single chip integrated DTV receiver to an antenna coupled thereto. The receive and transmit data may be pulse width modulated at a bit rate of about 8 KHz. In an embodiment of the invention, logic '0' may be approximately defined by a 41 μsec pulse, while logic '1' may be approximately defined by an 83 μsec pulse. However, the invention is not limited to these exemplary values.

Figure 4:
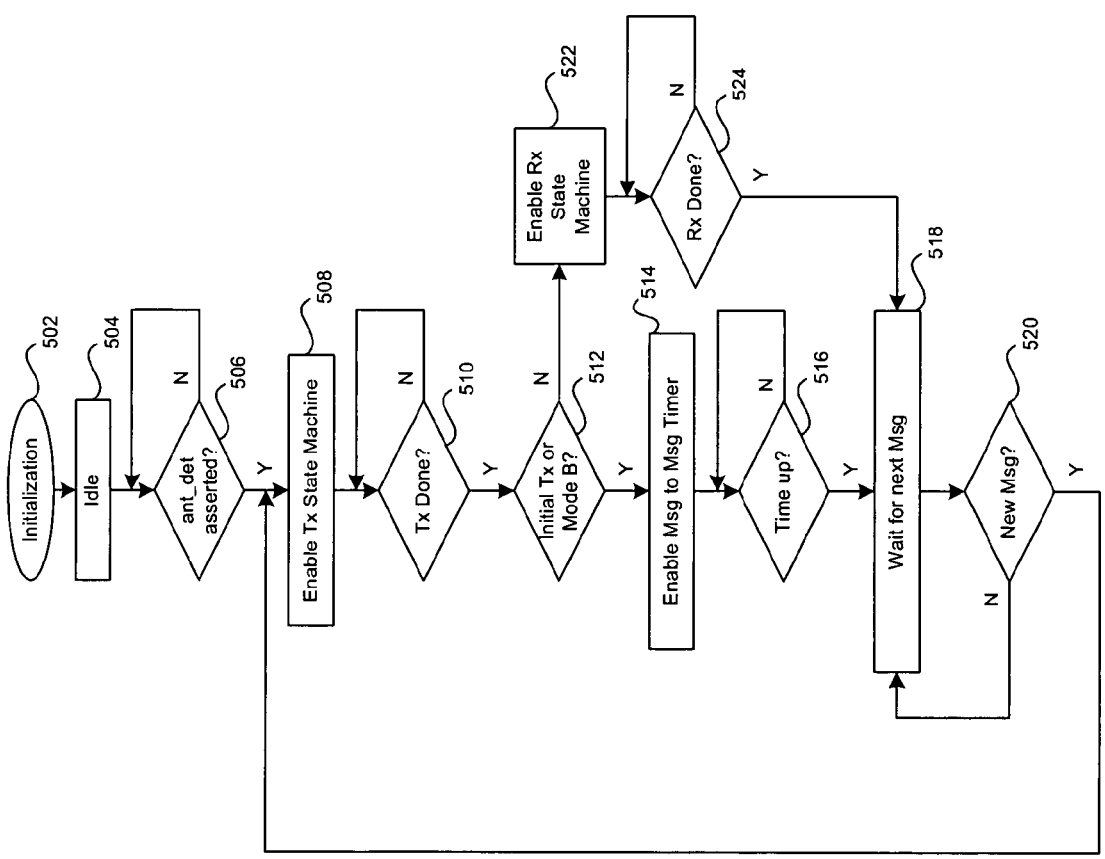
FIG. 4 is a flow chart illustrating exemplary steps that may be utilized by a master state machine for the EIA/CEA-909 compliant interface block 232 in accordance with an embodiment of the invention.

FIG. 4 is a flow chart illustrating exemplary steps that may be utilized by a master state machine for the EIA/CEA-909 compliant interface block 232 in accordance with an embodiment of the invention. Referring to FIG. 4, in step 502, initialization of the EIA/CEA-909 compliant interface 232 occurs, followed in step 504 by an idle state. In step 506, a determination is made whether the antenna detect signal (ant_det) is asserted. If the antenna detect signal (ant_det) is not asserted, then step 506 is repeated. If the antenna detect signal (ant_det) is asserted, then in step 508, a transmit state machine may be enabled. In step 510, a determination is made whether transmission is done. If transmission is not done, then step 510 is repeated. If transmission is done, then in step 512, a determination is made whether there was an initial transmission or a mode B operation. If there was an initial transmission, then in step 514, a message-to-message timer may be enabled. In step 516, a determination is made whether the timer has expired. If the timer has not expired, then step 516 is repeated. If the timer has expired, then in step 516, the next message is awaited. In step 520, a determination is made whether the new message is received. If a new message is not received, then control passes back to step 518. If a new message is received, then control passes back to step 508, where the transmit state machine is enabled. In step 512, if it is determined that it was not an initial transmission or mode B operation, then in step 522, a receive state machine is enabled. In step 524, a determination is made whether receiving is done. If receiving is not done, the step 524 is repeated. If receiving is done, then step 518 executed, where the next message is awaited.

The debug interface block 234 may be, for example, a JTAG compliant debug interface. The debug interface block 234 may be a test access port (TAP) that is compatible with IEEE Std. 1149.1, commonly known as the JTAG boundary scan interface.

The BSC/SPI slave interface block 236 may comprise a BSC interface block and an SPI interface block. The BSC interface block may be adapted to control a BSC interface mode and the serial peripheral interconnect (SPI) interface block may be adapted to control an SPI interface mode. In the BSC mode, the single chip integrated DTV receiver 202 may be controlled over a serial interface that may be compatible with, for example, at least a subset of the I$^2$C bus. In an embodiment of the invention, two (2) signals comprising a serial data (SDA) signal and a serial clock (SCL) signal may be utilized to control a plurality of devices coupled to a common serial bus. In general, the devices coupled to a serial bus may be addressed through various protocols established for providing communication over the two-wire interface. For example, the I$^2$C specification defines a plurality of addressing modes and/or protocols for use in a two (2) wired serial bus application. Although the BSC interface block may utilize a subset of the I$^2$C serial bus interface, the serial bus may be adapted so that devices coupled to the serial bus do not respond to general call addresses.

In SPI mode, the single chip integrated DTV receiver 202 may be controlled via a serial interface which may be compatible with at least a subset of the synchronous serial peripheral interconnect (SPI) bus. In one embodiment of the invention, four (4) signals comprising a serial clock (SCK) signal, a slave select (SS) signal, a master-in/slave-out (MISO) signal and a master-out/slave-in (MOSI) signal may be utilized to control a plurality of devices coupled to a common serial bus. At least one protocol layer of the SPI interface may be enhanced or at least one layer may be added in order to facilitate transfers from the single chip integrated DTV receiver 202.

The acquisition processor block 240 may comprise at least one programmable acquisition processor. The acquisition processor operations may be managed and/or controlled by suitable code so the host program requirements may be minimized. A simple application programming interface (API) may be utilized to communicate from the host to the internal processor.

The host access buffer (HAB) block 238 may be utilized by the host to issue commands to the ingle chip integrated DTV receiver 202, and request the single chip integrated DTV receiver's status and acquisition processor's internal state. To access the on-chip receivers in the integrated in the single chip integrated DTV receiver 202, the host may, for example, post a read or write request in the HAB 238 to access the registers. When the acquisition processor 240 is in a state where it can service host requests, the acquisition processor 240 may perform the request, then returns to its other programming tasks. This allows a request to be serviced in a time slot when it is convenient for the acquisition processor 240 to do so without affecting acquisition timing.

The host access buffer 238 is adapted to accommodate a series of access requests. Each request may contain information about the location that is to be accessed, identify a read or write operation, and define an access length, a required number of data fields, and a status bit associated with the request. Arbitration for providing access to the host access buffer 238 may be handled at the hardware level and/or the software level. A host access buffer command bit (HAB_CMD) bit may be utilized to prohibit simultaneous access from a host processor and a local processor. The host may setup the access, and the acquisition processor (AP) 240 may be prohibited from accessing the host access buffer 238 when the HAB_CMD bit is asserted. After a request has been issued, the host may deassert the HAB_CMD, and the acquisition processor 240 may be allowed access. The host may not access the host access buffer 238 until the acquisition processor asserts the HAB_CMD bit. One or more bits may be utilized to control access to the host access buffer from a host or local processor.

When a host processor determines that it needs to access the single chip integrated DTV receiver, it may check the status of the HAB_CMD bit to make sure there are no pending requests that have not been serviced. In instances where the host processor attempt to perform an access to the HAB 238 while the HAB_CMD=1, a HAB access violation may occur. In this instance, the host interface may continue to complete the access but the HAB 238 may not actually be written in case of a write, or the data that is read from the HAB 238 may not be valid in case of a read. Accordingly, an error condition may be generated and/or reported to for, example, a host system and/or processor. For example, a HAB error bit (H_HAB_ER) may be set in a status register such as a HAB status register (H_STAT1) and can generate an interrupt to the host processor or system depending on the value of the interrupt enable. This type of violation may have no affect on the operation of the acquisition processor which continues without exception. If the HAB_CMD=0, the host may post a request, or a series of requests up to the point where the requests may occupy the available space in the HAB 238. After the requests are posted, the host processor may set the HAB_CMD bit to logic 1. In an aspect of the invention, an interrupt may be generated to the acquisition processor 240 and/or host processor when the HAB_CMD bit is set to logic 1. Once the HAB 238 command bit is set to logic 1, the host processor may not be able to access the HAB 238 until the entire buffer has been serviced and HAB_CMD is cleared. The host processor or system may be dependent on the acquisition processor's ability to perform the requests in a timely manner.

In instances where a read is posted in the HAB 238, the host processor may need to wait until the HAB_CMD bit is cleared by the acquisition processor 240. This may indicate that the host access buffer 238 contains all the requested data. The host may then perform reads on the host access buffer 238 and fetch the requested data. Once the data is retrieved, the host may be adapted to post more requests as required.

The host access block 238 may be configured to queue a series of access requests. Each request may contain information corresponding to the location(s) to be accessed, a read/write indicator, an access length, the required number of data fields, and a status bit for the request. Arbitration for HAB access may be managed at the hardware level. The HAB_CMD bit may be utilized to prohibit access from the host and the acquisition processor simultaneously and the host may be adapted to configure the access. The acquisition processor block 240 may be prohibited from host access block 238 access, when the HAB_CMD bit is logic 0. After requests have been issued, the host may set the HAB_CMD bit to logic 1, and the acquisition processor may be allowed access, while the host may not be permitted to further access the host access buffer 238 until the acquisition processor 240 clears the HAB_CMD bit. It should be recognized that the logic levels may be altered for host access block 238 operations without departing from the various aspects of the invention.

Figure 5A:
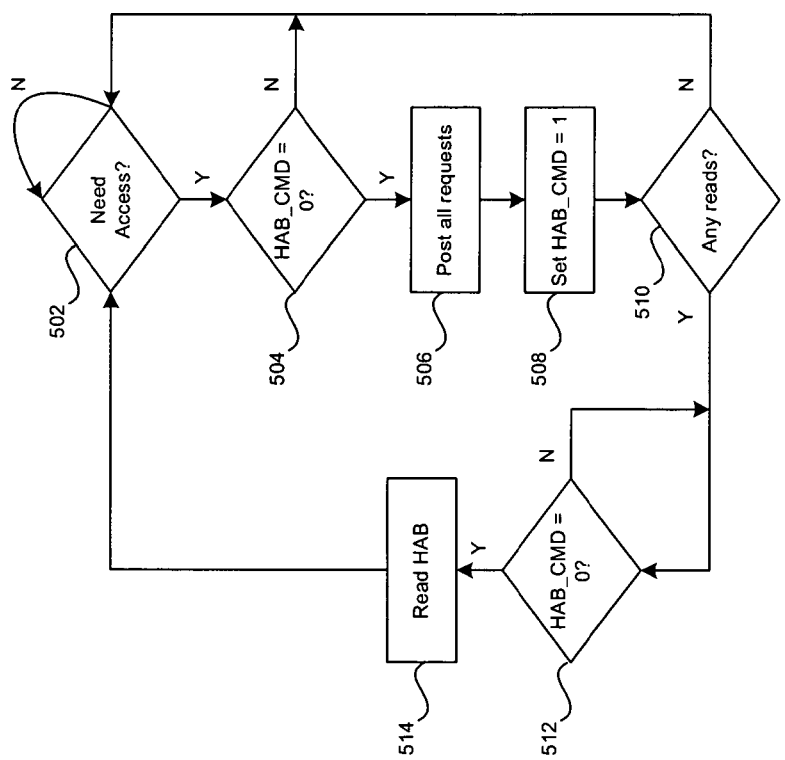
FIG. 5a is a flow chart illustrating exemplary steps that may be utilized for accessing the HAB by a host processor in accordance with an embodiment of the invention.

FIG. 5a is a flow chart illustrating exemplary steps that may be utilized for accessing the HAB by a host processor in accordance with an embodiment of the invention. Referring to FIG. 5a, in step 502, a determination is made as to whether access is needed to the host access buffer. If no access to the host access buffer is needed, then step 502 may continue looping until access is needed. If no access to the host buffer is needed, then control returns to step 502. If access to the host access buffer is needed, then in step 504, a determination is made as to whether the HAB_CMD bit is equal to logic 0. In step 506, some or all requests may be posted to the host access buffer. After the requests are posted, in step 508, the HAB_CMD bit may be set to logic 1. In step 510, a determination is made as to whether there are any read operations. If there are no read operations, then control returns to step 502. However, if there are read operations, then in step 512, it may be determined whether the HAB_CMD bit is equal to logic 0. If the HAB_CMD bit is not equal to logic 0, then step 512 is repeated until the HAB_CMD bit is equal to logic 0. When it is determined that the HAB_CMD bit is equal to logic 0, then in step 514, the host access buffer may be read. Subsequently, control may pass back to step 502.

When the acquisition processor 240 is capable of servicing a request from the host processor, the acquisition processor 240 may execute, for example, a host access buffer service routine. The acquisition processor may be adapted to initialize or otherwise setup an interrupt timer to the period allowed for performing accesses. In this regard, accesses may continue until a timer interrupt is generated. The acquisition processor 240 may determine whether the HAB_CMD bit is set. If so, then the acquisition processor 240 may initiate the requested series of accesses by scanning the host access buffer 238 looking for the first request that has not yet been serviced. This may be achieved by checking the local status bit that that may be associated with each request. Once the acquisition processor 240 finds a request that has not been serviced, that request may be serviced by the acquisition processor 240. When processing of that request is complete, the acquisition processor 240 may set the request status and moves to the next request. In instances when there are no more request in the host access buffer, the acquisition processor 238 may clear the HAB_CMD bit and may subsequently return to check for other requests in the host access buffer.

Figure 5B:
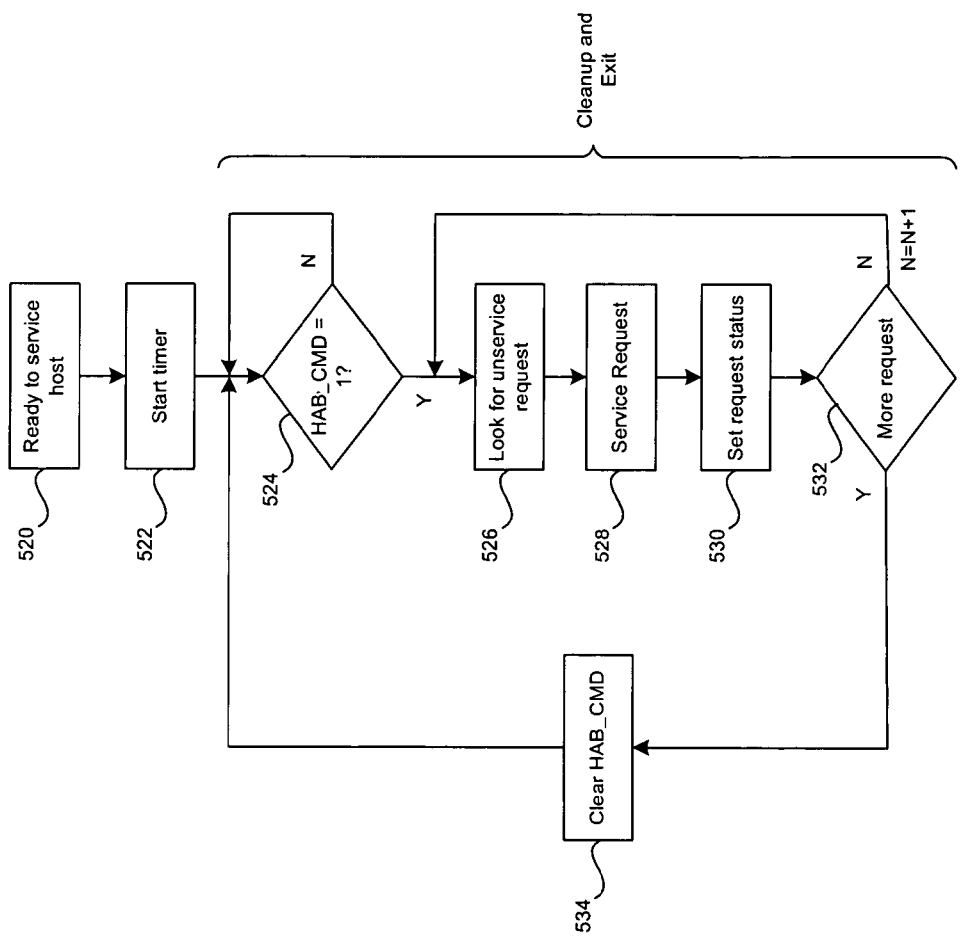
FIG. 5b is a flow chart illustrating exemplary steps that may be utilized for accessing and processing requests in the HAB 238 by an acquisition processor in accordance with an embodiment of the invention.

FIG. 5b is a flow chart illustrating exemplary steps that may be utilized for accessing and processing requests in the HAB 238 by an acquisition processor in accordance with an embodiment of the invention. Referring to FIG. 5b, in step 520, the acquisition processor is ready to provide service to the host processor. In step 504, in step 522, a timer may be started. In step 524, it may be determined whether the HAB_CMD bit is equal to logic 1. If the HAB_CMD is not set to 1, then step 524 may be repeated until the HAB_CMD bit is equal to logic 1. If the HAB_CMD bit is equal to logic 1, then in step 526, the acquisition processor may look for unserviced requests in the host access buffer. The unserviced requests may then be serviced in step 528. In step 530, a request status associated with each of the serviced requests may be set. In step 532, it may be determined whether there are more requests to be serviced. If there are no more requests to be serviced, then control returns to step 526. However, if there are more requests to be processed, then in step 534, the HAB_CMD bit may be set to logic zero or cleared. Control may then pass back to step 524.

Although the invention is sometimes described in term of functional blocks, some of the functions handled by a particular block of the single chip integrated DTV receiver 202 (FIG. 2a) may not be limited to the manner in which they are described. Accordingly, a function for a particular block may be accomplished in one or more of the other blocks integrated within the single chip integrated DTV receiver 202. For example, some of the functions of the inband output interface block 216 may be integrated in the ITU-T J.83 A/B/C FEC block 214. In another example, some of the functions of the inband output interface block 216 may be integrated in the ATSC FEC block 212.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method performed by at least one processor, at least one circuit, or any combination thereof integrated within a single digital television (DTV) receiver chip, the method comprising:
   demodulating a digital in-band signal and a digital out-of-band signal to generate a demodulated in-band signal and a demodulated out-of band signal, wherein said digital in-band signal is received from a first front end, wherein said digital out-of-band signal is received from a second front end, wherein said digital in-band signal comprises at least one of a vestigial side band (VSB) signal, a national television standards committee (NTSC) signal, or a quadrature amplitude modulation (QAM) signal, wherein said demodulating comprises equalizing said digital in-band signal and said digital out-of-band signal;
   error-correcting said demodulated in-band signal and said demodulated out-of-band signal to generate an error-corrected in-band signal and an error-corrected out-of-band signal; and
   generating an MPEG transport stream based on at least one of said error-corrected in-band signal or said error-corrected out-of-band signal.

2. The method according to claim 1, comprising decoding, by said at least one processor, said at least one circuit, or any combination thereof, said demodulated in-band signal.

3. The method according to claim 2, comprising generating, by said at least one processor, said at least one circuit, or any combination thereof, an audio output based on said decoding.

4. The method according to claim 3, wherein said audio output comprises at least one of an $I^2S$ audio output, a stereo audio output, a monaural audio output, or a multiplexed baseband audio output.

5. The method according to claim 1, wherein said MPEG transport stream comprises a serial MPEG transport stream.

6. The method according to claim 1, wherein said MPEG transport stream comprises a parallel MPEG transport stream.

7. The method according to claim 1, comprising generating, by said at least one processor, said at least one circuit, or any combination thereof, a composite NTSC based on said digital in-band signal.

8. The method according to claim 1, comprising demodulating, by said at least one processor, said at least one circuit, or any combination thereof, said digital out-of-band signal utilizing a QPSK demodulator.

9. The method according to claim 1, comprising generating, by said at least one processor, said at least one circuit, or any combination thereof, an output out-of-band transport stream based on said digital out-of-band signal.

10. The method according to claim 9, wherein said output out-of-band transport stream comprises CableCard encryption and security data.

11. A non-transitory machine-readable storage medium having stored thereon a computer program having at least one code section for processing signals in a communication system, the at least one code section being executable by a machine to cause the machine to:
    demodulate a digital in-band signal and a digital out-of-band signal to generate a demodulated in-band signal and a demodulated out-of-band signal, wherein said digital in-band signal is received from a first front end, wherein said digital out-of-band signal is received from a second front end, wherein said digital in-band signal comprises at least one of a vestigial side band (VSB) signal, a national television standards committee (NTSC) signal, or a quadrature amplitude modulation (QAM) signal;
    error-correct said demodulated in-band signal and said demodulated out-of-band signal to generate an error-corrected in-band signal and an error-corrected out-of-band signal; and
    generate an MPEG transport stream based on at least one of said error-corrected in-band signal or said error-corrected out-of-band signal.

12. The non-transitory machine-readable storage medium according to claim 11, wherein the at least one code section causes the machine to decode said demodulated in-band signal.

13. The non-transitory machine-readable storage medium according to claim 12, wherein the at least one code section causes the machine to generate an audio output based on said digital in-band signal.

14. The non-transitory machine-readable storage medium according to claim 13, wherein said audio output at least one of an $I^2S$ audio output, a stereo audio output, a monaural audio output, or a multiplexed baseband audio output.

15. The non-transitory machine-readable storage medium according to claim 11, wherein said MPEG transport stream comprises a serial MPEG transport stream.

16. The non-transitory machine-readable storage medium according to claim 11, wherein said MPEG transport stream comprises a parallel MPEG transport stream.

17. The non-transitory machine-readable storage medium according to claim 11, wherein the at least one code section causes the machine to generate a composite NTSC signal based on said digital in-band signal.

18. The non-transitory machine-readable storage medium according to claim 11, wherein the at least one code section causes the machine to demodulate said digital out-of-band signal utilizing a QPSK demodulator.

19. The non-transitory machine-readable storage medium according to claim 11, wherein the at least one code section causes the machine to generate an output out-of-band transport stream based on the digital out-of-band signal.

20. The non-transitory machine-readable storage medium according to claim 19, wherein said output out-of-band transport stream comprises CableCard encryption and security data.

21. A system for processing signals in a communication system, the system comprising:
   at least one processor, at least one circuit, or any combination thereof integrated within a single digital television (DTV) receiver chip, said at least one processor, said at least one circuit, or any combination thereof being operable to:
      demodulate a digital in-band signal and a digital out-of-band signal to generate a demodulated in-band signal and a demodulated out-of-band signal, wherein said digital in-band signal is received from a first front end, wherein said digital out-of-band signal is received from a second front end, wherein said digital in-band signal comprises at least one of a vestigial side band (VSB) signal, a national television standards committee (NTSC) signal, or a quadrature amplitude modulation (QAM) signal;
      error-correct said demodulated in-band signal and said demodulated out-of-band signal to generate an error-corrected in-band signal and an error-corrected out-of-band signal; and
      generate an MPEG transport stream based on at least one of said error-corrected in-band signal or said error-corrected out-of-band signal.

22. The system according to claim 21, wherein said at least one processor, said at least one circuit, or any combination thereof are operable to decode said digital in-band signal.

23. The system according to claim 21, wherein said at least one processor, said at least one circuit, or any combination thereof are operable to generate an audio output based on said digital in-band signal.

24. The system according to claim 22, wherein said audio output comprises at least one of an $I^2S$ audio output, a stereo audio output, a monaural audio output, or a multiplexed baseband audio output.

25. The system according to claim 21, wherein said MPEG transport stream comprises a serial MPEG transport stream.

26. The system according to claim 21, wherein said MPEG transport stream comprises a parallel MPEG transport stream.

27. The system according to claim 21, wherein said at least one processor, said at least one circuit, or any combination thereof are operable to generate a composite NTSC signal from said demodulated in-band signal.

28. The system according to claim 21, wherein said at least one processor, said at least one circuit, or any combination thereof are operable to demodulate said digital out-of-band signal utilizing a QPSK demodulator.

29. The system according to claim 21, wherein said at least one processor, said at least one circuit, or any combination thereof are operable to generate an output out-of-band transport stream based on said digital out-of-band signal.

30. The system according to claim 29, wherein said output out-of-band transport stream comprises CableCard encryption and security data.

31. A method for processing signals in a communication system, the method comprising:
   demodulating, in a single digital television (DTV) receiver chip, a digital in-band signal and a digital out-of-band signal to generate a demodulated in-band signal and a demodulated out-of-band signal, wherein said digital in-band signal is received from an in-band analog front end, wherein said digital out-of-band signal is received from an out-of-band analog front end, wherein said digital in-band signal comprises at least one of a vestigial side band (VSB) signal, a national television standards committee (NTSC) signal, or a quadrature amplitude modulation (QAM) signal, wherein said demodulating comprises equalizing said digital in-band signal and said digital out-of-band signal; and
   generating, in said single digital television (DTV) receiver chip, an MPEG transport stream based on at least one of said demodulated in-band signal or said demodulated out-of-band signal.

32. The method according to claim 31, comprising error-correcting, in said single digital television (DTV) receiver chip, said demodulated in-band signal and said demodulated out-of-band signal prior to said generating of said MPEG transport stream.

33. The method according to claim 31, comprising decoding, in said single digital television (DTV) receiver chip, said digital in-band signal.

34. The method according to claim 33, comprising generating, in said single digital television (DTV) receiver chip, an audio output based on said decoding.

35. The method according to claim 34, wherein said audio output comprises at least one of an $I^2S$ audio output, a stereo audio output, a monaural audio output, or a multiplexed baseband audio.

36. The method according to claim 31, wherein said MPEG transport stream comprises a serial MPEG transport stream.

37. The method according to claim 31, wherein said MPEG transport stream comprises a parallel MPEG transport stream.

38. The method according to claim 31, comprising generating, in said single digital television (DTV) receiver chip, a composite NTSC signal from said demodulated in-band signal.

39. The method according to claim 31, comprising demodulating, in said single digital television (DTV) receiver chip, said digital out-of-band signal utilizing a QPSK demodulator.

40. The method according to claim 31, comprising generating, in said single digital television (DTV) receiver chip, an output out-of-band transport stream based on said digital out-of-band signal.

41. The method according to claim 40, wherein said output out-of-band transport stream comprises CableCard encryption and security data.

42. A non-transitory machine-readable storage medium having stored thereon a computer program having at least one code section for processing signals in a communication system, the at least one code section being executable by a machine to cause the machine to:

demodulate, in a single digital television (DTV) receiver chip, a wirelessly received digital in-band signal and a wirelessly received digital out-of-band signal to generate a demodulated in-band signal and a demodulated out-of-band signal, wherein said wirelessly received digital in-band signal is received from a first front end, wherein said wirelessly received digital out-of-band signal is received from a second front end, wherein said wirelessly received digital in-band signal comprises at least one of a vestigial side band (VSB) signal, a national television standards committee (NTSC) signal, or a quadrature amplitude modulation (QAM) signal; and generate, in said single digital television (DTV) receiver chip, an MPEG transport stream based on at least one of said demodulated in-band signal or said demodulated out-of-band signal.

43. The non-transitory machine-readable storage medium according to claim 42, wherein the at least one code section causes the machine to error-correct said demodulated in-band signal and said demodulated out-of-band signal prior to generating said MPEG transport stream.

44. The non-transitory machine-readable storage medium according to claim 42, wherein the at least one code section causes the machine to decode said wirelessly received digital in-band signal.

45. The non-transitory machine-readable storage medium according to claim 44, wherein the at least one code section causes the machine to generate an audio output based on said decoding of said wirelessly received digital in-band signal.

46. The non-transitory machine-readable storage medium according to claim 45, wherein said audio output comprises at least one of an I$^2$S audio output, a stereo audio output, a monaural audio output, or a multiplexed baseband audio output.

47. The non-transitory machine-readable storage medium according to claim 42, wherein said MPEG transport stream comprises a serial MPEG transport stream.

48. The non-transitory machine-readable storage medium according to claim 42, wherein said MPEG transport stream comprises a parallel MPEG transport stream.

49. The non-transitory machine-readable storage medium according to claim 42, wherein the at least one code section causes the machine to generate a composite NTSC signal from said demodulated in-band signal.

50. The non-transitory machine-readable storage medium according to claim 42, wherein the at least one code section causes the machine to demodulate said wirelessly received digital out-of-band signal utilizing a QPSK demodulator.

51. The non-transitory machine-readable storage medium according to claim 42, wherein the at least one code section causes the machine to generate an output out-of-band transport stream from said wirelessly received digital out-of-band signal.

52. The non-transitory machine-readable storage medium according to claim 51, wherein said output out-of-band transport stream comprises CableCard encryption and security data.

53. A system for processing signals in a communication system, the system comprising:
a single digital television (DTV) receiver chip being operable to:
demodulate a wirelessly received digital in-band signal and a wirelessly received digital out-of-band signal to generate a demodulated in-band signal and a demodulated out-of-band signal, wherein said wirelessly received digital in-band signal is received from an in-band analog front end, wherein said wirelessly received digital out-of-band signal is received from an out-of-band analog front end, wherein said digital in-band signal comprises at least one of a vestigial side band (VSB) signal, a national television standards committee (NTSC) signal, or a quadrature amplitude modulation (QAM) signal; and
generate an MPEG transport stream based on at least one of said demodulated in-band signal or said demodulated out-of-band signal.

54. The system according to claim 53, wherein said single digital television (DTV) receiver chip is operable to error-correct said demodulated in-band signal and said demodulated out-of-band signal prior to generating said MPEG transport stream.

55. The system according to claim 53, wherein said single digital television (DTV) receiver chip is operable to decode said wirelessly received digital in-band signal.

56. The system according to claim 55, wherein said single digital television (DTV) receiver chip is operable to generate an audio output based on said decoding of said wirelessly received digital in-band signal.

57. The system according to claim 56, wherein said audio output comprises at least one of an I$^2$S audio output, a stereo audio output, a monaural audio output, or a multiplexed baseband audio output.

58. The system according to claim 53, wherein said MPEG transport stream comprises a serial MPEG transport stream.

59. The system according to claim 53, wherein said MPEG transport stream comprises a parallel MPEG transport stream.

60. The system according to claim 53, wherein said single digital television (DTV) receiver chip is operable to generate a composite NTSC signal from said demodulated in-band signal.

61. The system according to claim 53, wherein said single digital television (DTV) receiver chip is operable to demodulate said wirelessly received digital out-of-band signal utilizing a QPSK demodulator.

62. The system according to claim 53, wherein said single digital television (DTV) receiver chip is operable to generate an output out-of-band transport stream from said wirelessly received digital out-of-band signal.

63. The system according to claim 62, wherein said output out-of-band transport stream comprises CableCard encryption and security data.

* * * * *